(12) United States Patent  
Lawson (10) Patent No.: US 6,508,114 B2
(45) Date of Patent: Jan. 21, 2003

(54) WEBBING TENSION SENSOR (75) Inventor: Richard Lawson, Newtown, NY (US)

(73) Assignee: Casco Products Corporation, Bridgeport, CT (US)

( * ) Notice: Subject to any disclaimer, the term of this patent is extended or adjusted under 35 U.S.C. 154(b) by 0 days.

(21) Appl. No.: 09/725,390

(22) Filed: Nov. 29, 2000

(65) Prior Publication Data

US 2002/0062688 A1 May 30, 2002

(51) Int. Cl.[7] .................................................. G01L 5/04
(52) U.S. Cl. ........................................................ 73/159
(58) Field of Search .......................... 73/153, 159, 160, 73/862.392, 862.393

(56) References Cited

U.S. PATENT DOCUMENTS

| 2,092,303 | A | | 9/1937 | Conrad | |
|---|---|---|---|---|---|
| 2,343,229 | A | | 2/1944 | Stone et al. | |
| 2,452,302 | A | | 10/1948 | Hitchen | 73/144 |
| 2,809,519 | A | | 10/1957 | Kaestner | |
| 2,986,932 | A | | 6/1961 | Melton | |
| 3,426,589 | A | | 2/1969 | Brendel | 73/144 |
| 3,618,378 | A | | 11/1971 | Shull et al. | 73/144 |
| 3,817,093 | A | | 6/1974 | Williams | 73/144 |
| 4,103,842 | A | | 8/1978 | Martin et al. | 242/107.4 |
| 4,433,586 | A | | 2/1984 | Ohrnell et al. | |
| 4,663,862 | A | * | 5/1987 | Gorissen | 34/52 |
| 4,801,853 | A | * | 1/1989 | Lewis et al. | 242/334.4 |
| 4,943,087 | A | | 7/1990 | Sasaki | |
| 5,060,977 | A | | 10/1991 | Saito | |
| 5,309,135 | A | | 5/1994 | Langford | |
| 5,369,425 | A | * | 11/1994 | Balzeit et al. | 346/138 |
| 5,430,334 | A | | 7/1995 | Meister | 307/10.1 |
| 5,454,591 | A | | 10/1995 | Mazur et al. | |
| 5,494,311 | A | | 2/1996 | Blackburn et al. | |
| 5,570,903 | A | | 11/1996 | Meister et al. | |
| 5,571,382 | A | * | 11/1996 | Berglund | 162/111 |
| 5,583,476 | A | | 12/1996 | Langford | |
| 5,605,348 | A | | 2/1997 | Blackburn et al. | |
| 5,618,056 | A | | 4/1997 | Schoos et al. | |
| 5,636,864 | A | | 6/1997 | Hori | |
| 5,742,986 | A | | 4/1998 | Corrion et al. | 24/633 |
| 5,871,063 | A | | 2/1999 | Young | 180/268 |
| 5,960,523 | A | | 10/1999 | Husby | 24/633 |
| 5,965,827 | A | | 10/1999 | Stanley et al. | 73/862.391 |
| 5,996,421 | A | | 12/1999 | Husby | 73/862.451 |
| 6,081,759 | A | | 6/2000 | Husby et al. | |
| 6,185,914 | B1 | * | 2/2001 | Mackie | 53/556 |
| 6,230,081 | B1 | | 5/2001 | Husby | |

FOREIGN PATENT DOCUMENTS

| EP | 0589466 | 3/1994 | |
|---|---|---|---|
| EP | 0531753 | 2/1995 | G01L/5/10 |
| WO | 9927337 | 6/1999 | G01L/3/02 |
| WO | 9929538 | 6/1999 | B60R/21/00 |
| WO | 9935476 | 7/1999 | G01L/3/02 |

OTHER PUBLICATIONS

General Motors Corporation R&D Center, "Magnetic Field Sensors for Magnetic Position Sensing in Automotive Applications" pp. 1–15; Joseph P. Heremans Apr. 1, 1997.

* cited by examiner

Primary Examiner—Max Noori
(74) Attorney, Agent, or Firm—Mitchell D. Bittman; Louis C. Dujmich (57) ABSTRACT A webbing tension sensing unit which includes a base and a cover and an elastically biasing element mounted within the base and cover. The webbing of, for example, a seat belt is operably connected to a sensor also housed within the base and cover. The sensor detects movement in relation to the elastically biasing element and generates electrical signals in proportion to the movement as a function of the tension in the webbing. The signals are used for analysis as part of a system to determine if devices such as an air bag or warning light should be triggered.

27 Claims, 12 Drawing Sheets

WEBBING TENSION SENSOR

BACKGROUND OF THE INVENTION

The present invention relates to a webbing tension sensor and more particularly to a webbing tension sensor that detects changes in the tension within a webbing, for example, a seat belt webbing, to enable operation of safety and other devices.

Most vehicles today are equipped with safety devices. One of the earliest and arguably most effective of these devices is the seat belt. Historically, as automobiles became increasingly pervasive, it soon became apparent that people riding in vehicles had a much better chance of surviving a crash if they remained with the vehicle. Early race car drivers pioneered the use of safety restraints, and eventually this important safety feature made its way into the consumer market as the seat belt. Seat belt use is mandatory in many states in the United States.

Now many other safety devices such as air bags and crash warning systems are becoming more commonplace. One of the difficulties associated with the operation of these devices is determining when they need to activate. Air bags have been particularly troublesome due to the explosive reaction necessary to deploy them in an effective time period. Children and smaller adults have been injured and even killed by a deploying air bag. It is essential for all these safety devices to operate reliably and at the proper time. Many methods have been employed in the past to meet these requirements and because seat belt use is becoming pervasive, it is natural for manufacturers of vehicles and safety devices to exploit seat belt tension as a way to determine the need for further action.

Seat belt tension is affected by accelerating forces, many of which are generated in an emergency situation. Designing a simple, low cost device that reliably measures seat belt tension has proven difficult. Past devices generally include many moving parts with sensitive components which are difficult to calibrate. The same is true of other devices which utilize an internal mass to detect accelerating forces. Additionally, special mounting brackets must be used to equip the vehicle with the prior art devices.

There is a need for a simple, yet reliable device that is compact, easy to calibrate and does not require specialized mounting anchors, to monitor seat belt tension in order to trigger safety and other devices in response to changes in seat belt tension.

SUMMARY OF THE INVENTION

It is an object of the present invention to provide a reliable seat belt tension sensing unit that has relatively few moving parts. It is another object of the present invention to provide a seat belt tension sensing unit that is inexpensive to manufacture.

It is yet another object of the present invention to provide a seat belt tension sensing unit that can be used without modifying the webbing anchors currently used by a seat belt.

It is a further object of the present invention to provide a seat belt tension sensing unit that uses a small number of springs to detect the tension in a seat belt.

It is yet a further object of the present invention to provide a seat belt tension sensing unit that uses a hall effect sensor that is easily calibrated in order to decrease the manufacturing tolerances required for reliable use thereby decreasing the cost to produce the unit.

It has been found that the objects of the present invention can be met by a seat belt tension sensing unit that includes a hinge arm pivotally connected to a base. The hinge arm is elastically biased against a segment of seat belt webbing that passes through an opening in a cover which encloses the unit. As the tension changes in the webbing, a hall sensor detects the movement of a magnet attached to the hinge arm. Signals generated by the hall sensor are used for analysis as part of a system to determine if the air bag should be deployed in an emergency.

It has been further found that the objects of the present invention can also be met by a seat belt tension sensing unit that includes a fixed anchor portion and a movable anchor portion and at least one elastic element such as a spring. The elastic element is moveably mounted between the fixed and movable anchor portions. Seat belt webbing is connected to the movable anchor portion and a sensor detects the movement of a magnet that moves with the movable anchor portion as a function of the tension in the webbing. Signals generated by the sensor are used for analysis as part of a system to determine if the air bag should be deployed in an emergency.

Other features and advantages of the present invention will become apparent from the following description of the invention which refers to the accompanying drawings.

DETAILED DESCRIPTION OF EMBODIMENTS OF THE INVENTION

Figure 1:
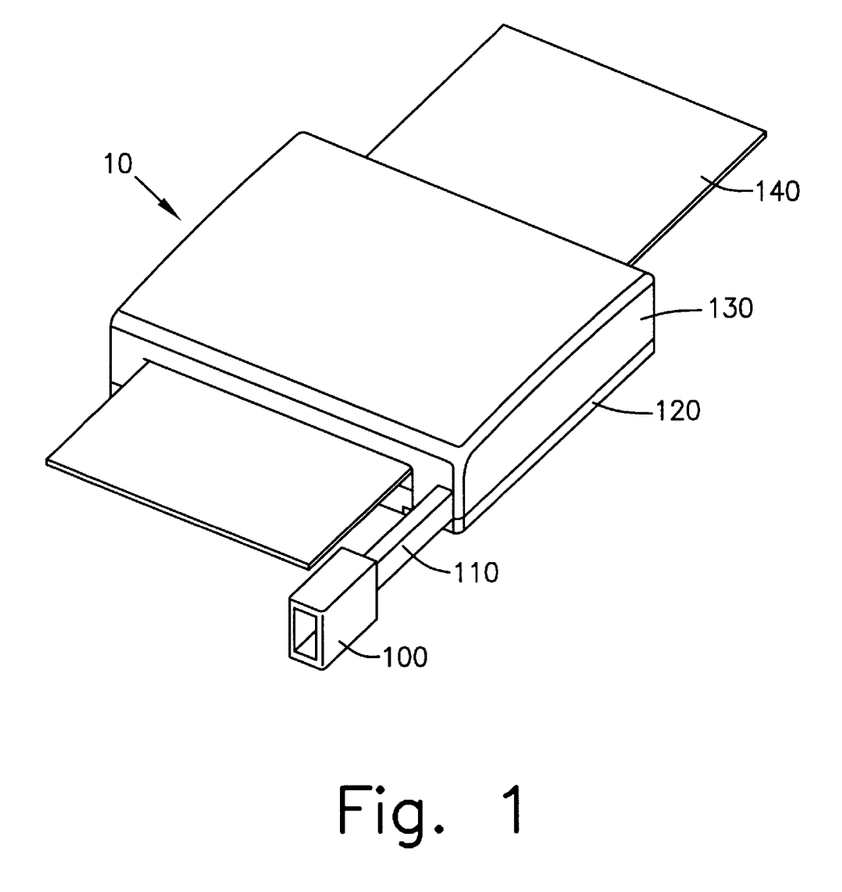
FIG. 1 is an external perspective showing the top view of a first embodiment of the present invention.
Figure 2:
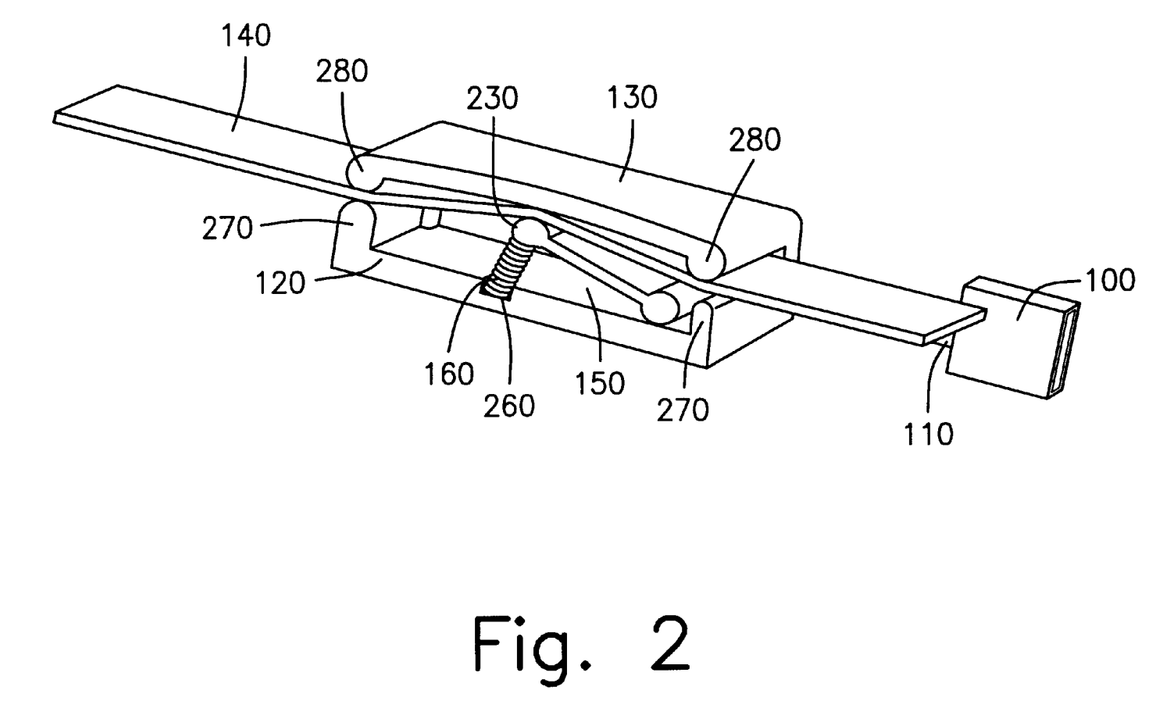
FIG. 2 shows a cut-away view arranged according to a first embodiment of the present invention.
Figure 3:
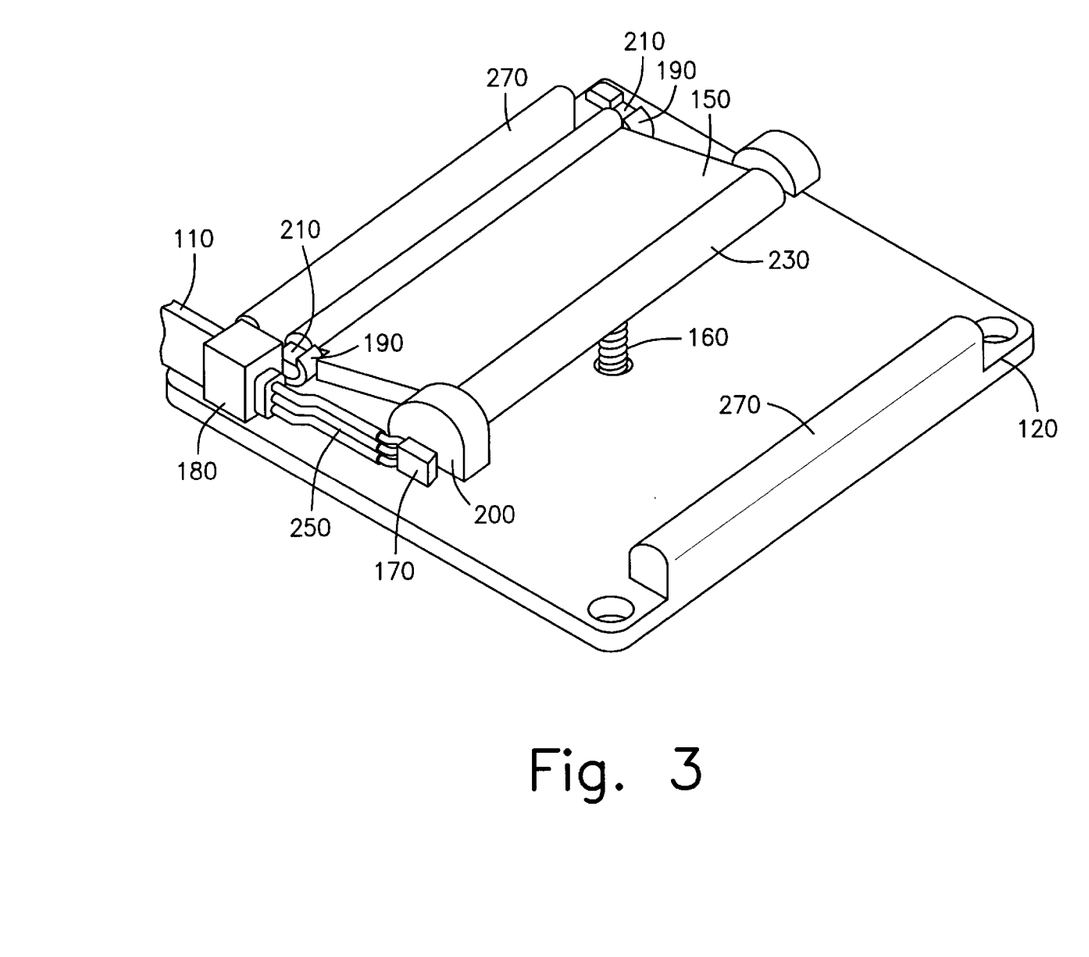
FIG. 3 is a top view of a first embodiment of the present invention with the cover removed.

Referring to FIGS. 1–3, a first embodiment of a seat belt tension sensing unit is shown generally as 10 includes a seat belt webbing 140 which passes through an opening in a cover 130 that protects and encloses unit 10. A base 120 provides a stable platform for attaching a hinge arm 150 and a spring 160, which are preferably the only moving parts in this embodiment of the present invention. One end of the base 120 and cover 130 are clamped together on the webbing 140 to keep the unit in place. On the opposite end, the webbing 140 is free to move.

Hinge arm 150 includes two pivot pins 210 which are resiliently held in place by pivot guides 190. Pivot guides 190 can be molded from the same material as base 120 or can be mounted to base 120 as separate assemblies. Hinge arm 150 is free to rotate around pivot pin 210 which allows hinge arm free end 230 to move in response to variations in the tension within seat belt webbing 140.

Hinge arm free end 230 is elastically biased towards seat belt webbing 140 by spring 160. Spring 160 is preferably a coil spring, but it is understood that any resilient elastic material may be used to urge hinge arm free end 230 against seat belt webbing 140. For example, a sheet metal spring or even a magnetically repulsive arrangement of two like pole magnets could provide the necessary biasing to urge hinge arm free end 230 against seat belt webbing 140 without departing from the spirit of the invention.

Figure 4:
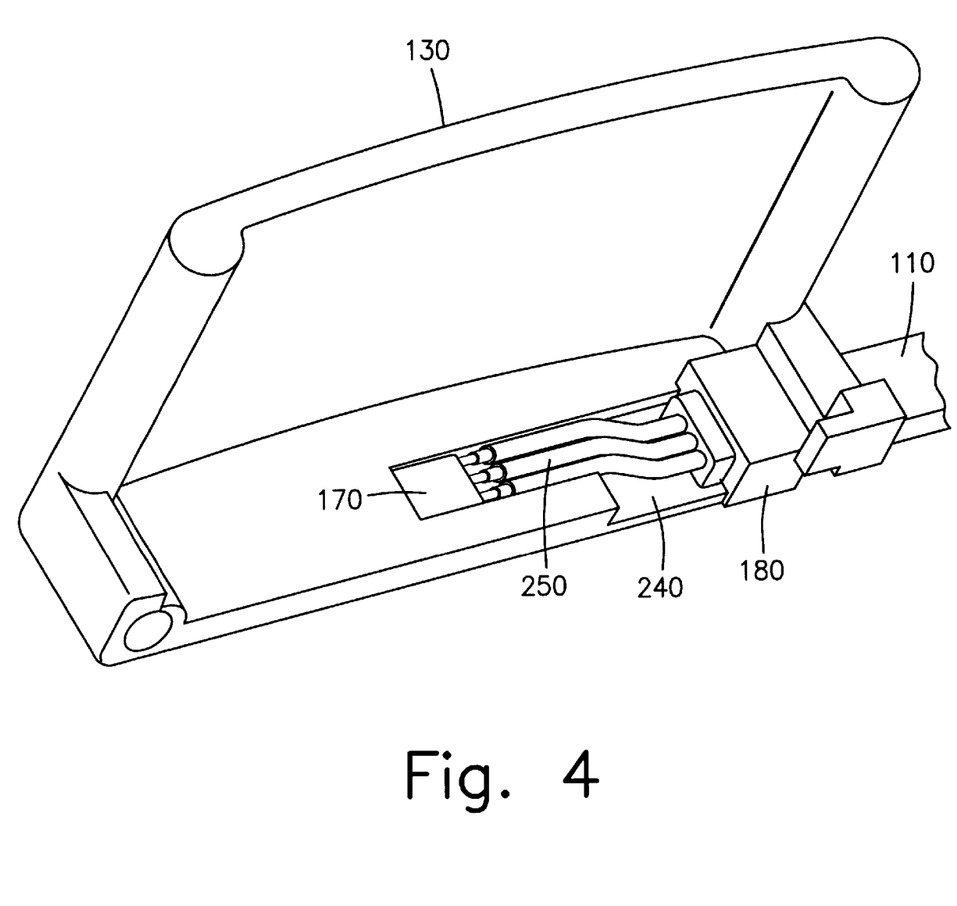
FIG. 4 shows a cut-away view detailing the placement of the sensor.
Figure 5:
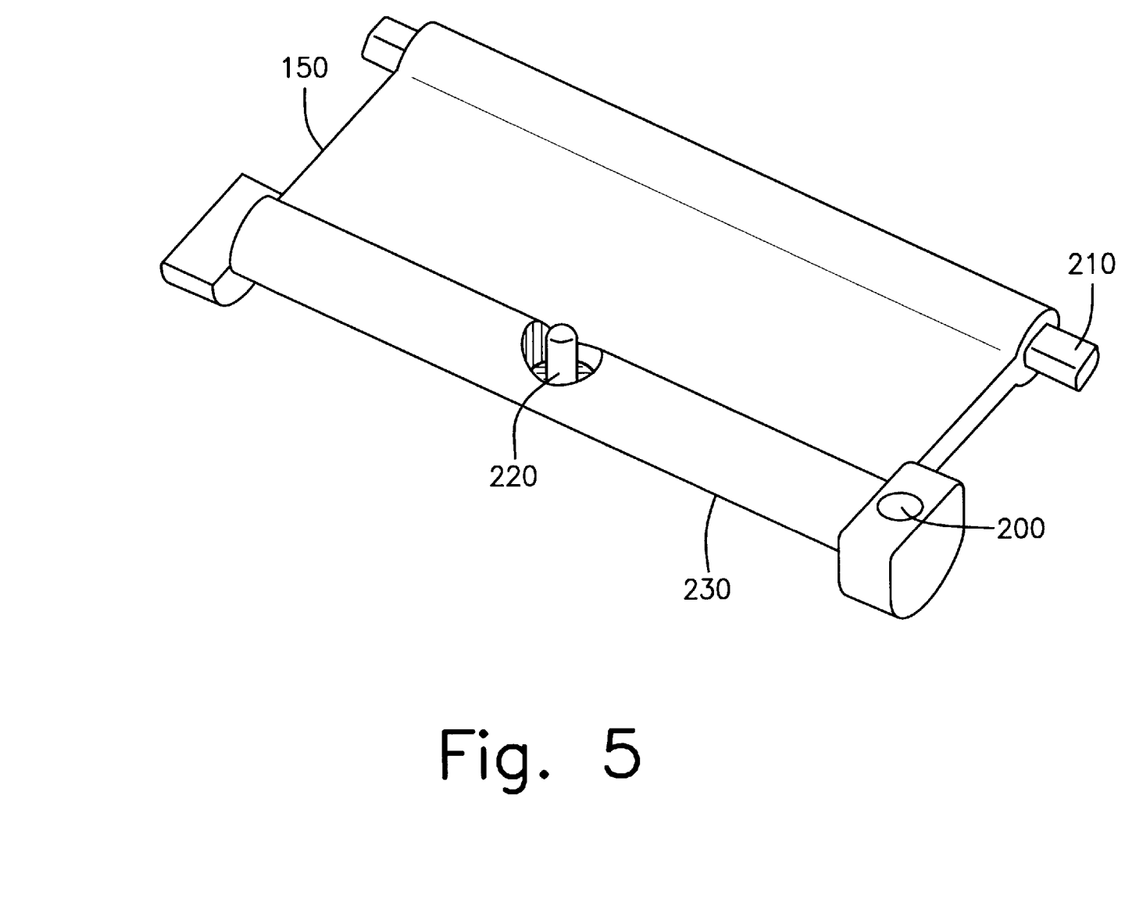
FIG. 5 is a bottom view of the hinge arm.
Figure 6:
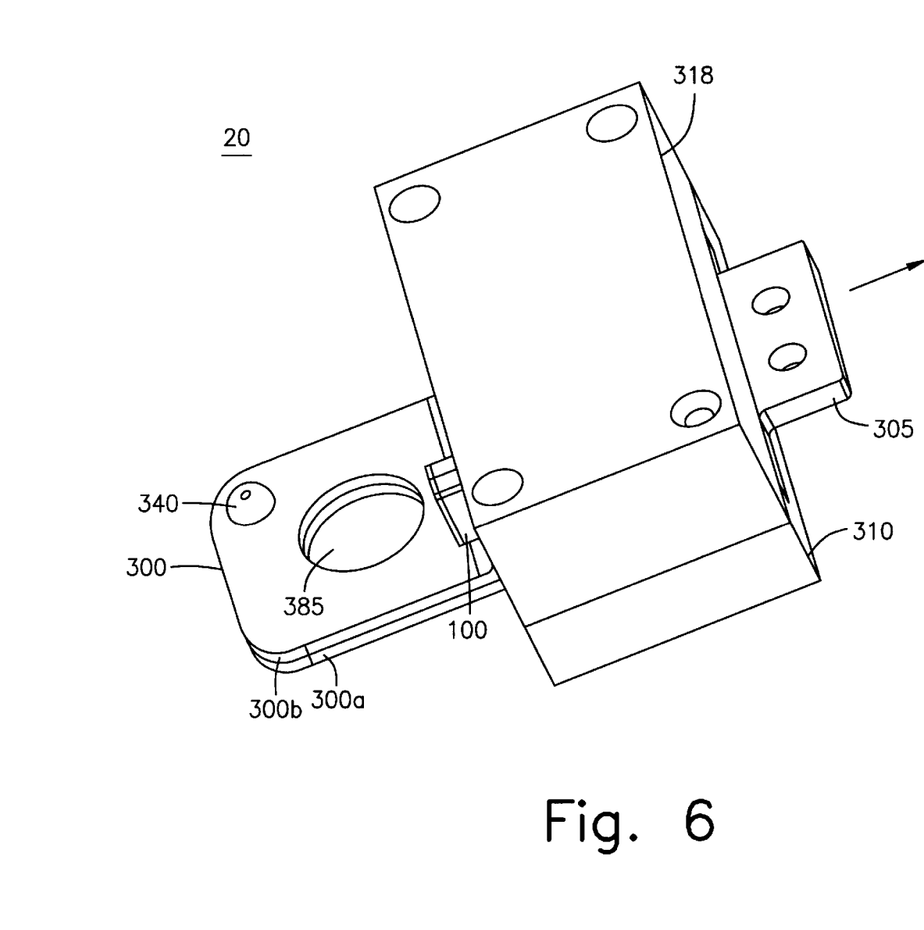
FIG. 6 is an external perspective view of a second embodiment of the present invention.

Referring now to FIGS. 4 and 5, a sensor, preferably a hall effect sensor 170, is used to detect movement of hinge arm free end 230. The sensor preferably is mounted immovably with respect to the base 120 or on base 120 or on cover 130. A permanent magnet 200 is embedded or otherwise attached to one end of hinge arm free end 230. Other arrangements are acceptable including mounting hall effect sensor 170 on hinge arm free end 230 and mounting magnet 200 on base 120 or cover 130. This makes connecting hall effect sensor 170 more difficult, but it is within the scope of this invention should that configuration be desirable.

In an embodiment, hall effect sensor 170 fits into sensor slot 240 formed in cover 130. In this way, hall effect sensor 170 is protected and reliably positioned proximate to magnet 200.

Wires 250 electrically connect hall effect sensor 170 to the desired devices (e.g., air bag or warning light). Wires 250 are secured using a strain relief 180 to protect them from being stretched or compressed while in use. A wiring harness 110 protects wires 250 and is joined to strain relief 180. A connector 100 is used to facilitate assembly of seat belt sensing unit 10 in the vehicle (not shown).

Referring to FIGS. 3 and 5, spring 160 rests between a hinge arm spring pin 220 and a base spring pin 260 (FIG. 2). These pins are sized to fit within the internal diameter of the spring 160. These act to hold spring 160 in place while allowing hinge arm 150 to move as the tension in seat belt webbing 140 changes. The edge of hinge arm free end 230 is at least partially rounded to allow seat belt webbing 140 to slide without binding.

In operation, seat belt tension sensing unit 10 is arranged so that seat belt webbing 140 passes between cover 130 and base 120. Hinge arm 150 is pressed upward contacting a portion of webbing 140 interior to cover 130. Hinge arm 150 causes webbing 140 to move downward under normal operating conditions. The movement of hinge arm 150 is detected by Hall sensor 170. The signal detected by Hall sensor 170 is used for analysis as part of a system to determine whether or not to deploy an air bag should an emergency braking occur. In a situation such as emergency braking, the increased tension in webbing 140 forces hinge arm 150 to move down as the webbing straightens.

A second embodiment of a webbing sensor unit is shown in FIGS. 6–12. A seat belt sensor unit is shown generally as 20, and includes a base 310, a top cover 318, a fixed anchor 300 and a movable anchor member 305. Fixed anchor 300 can be used to anchor seat belt sensor 20 to a fixed mounting support located in a vehicle (not shown). Both cover and base (310 and 318) are preferably made of plastic, but any suitable material may be used.

Figure 11:
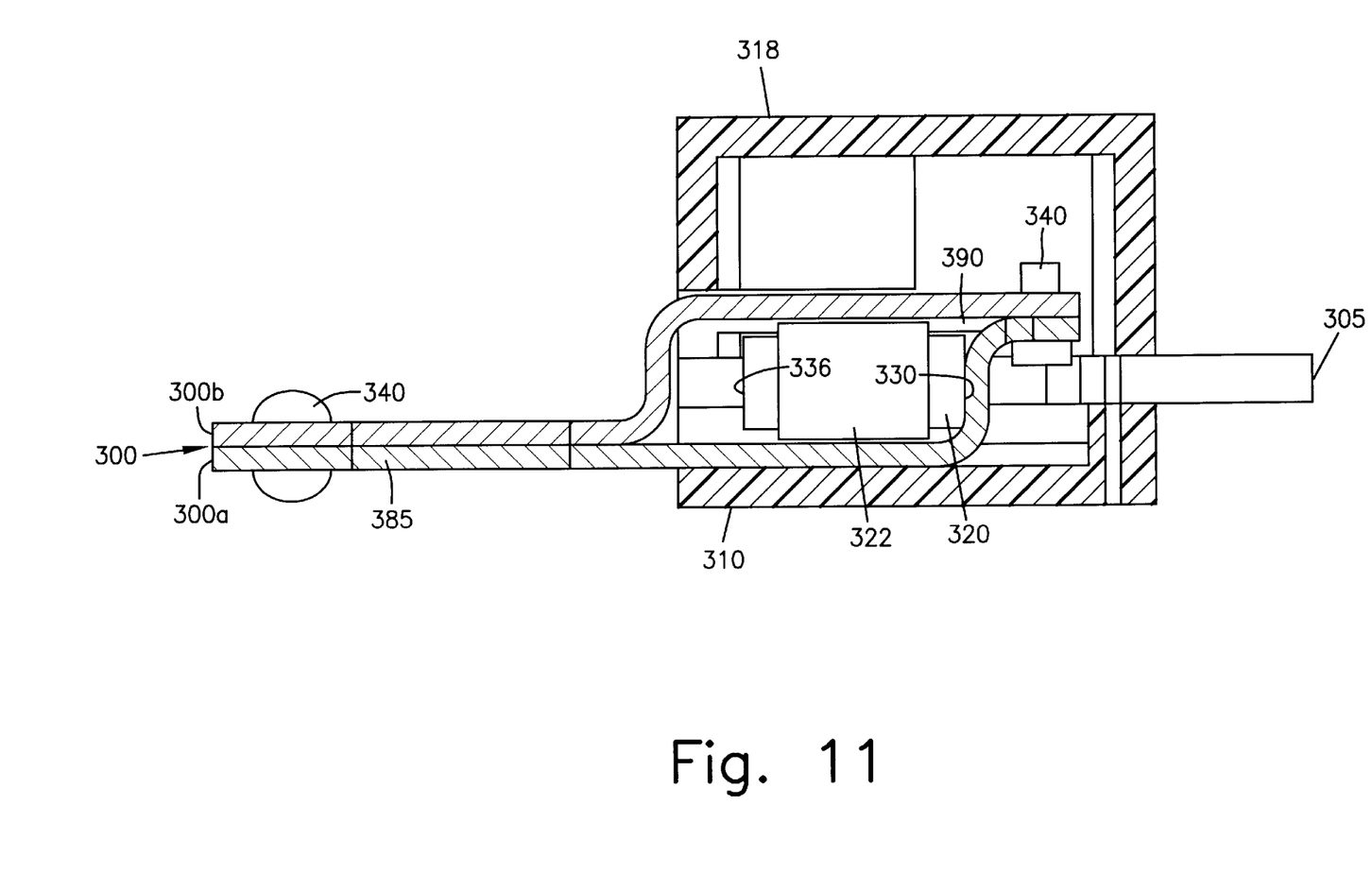
FIG. 11 is a cut-away side view according to an embodiment of the present invention.

Referring to FIG. 11, fixed anchor 300 has two components, a top anchor layer 300b and a bottom anchor layer 300a. Mounting hole 385 is designed to fit over a mounting bolt (not shown) to securely attach unit 20 to the vehicle. Top and bottom anchor layers 300a and 300b are bent and joined together using rivets 340 disposed on the left and right ends to securely hold fixed anchor 300 together. An interior spring chamber 390 is formed between top anchor layer 300b and bottom anchor layer 300a with portions of the chamber 390 being closed off by moveable anchor 305. Anchor 300 is preferably made from steel, but any suitable material may be used as long as an anchor 300 is strong enough to withstand the forces of applied to anchor 300 during high stress events.

Figure 9:
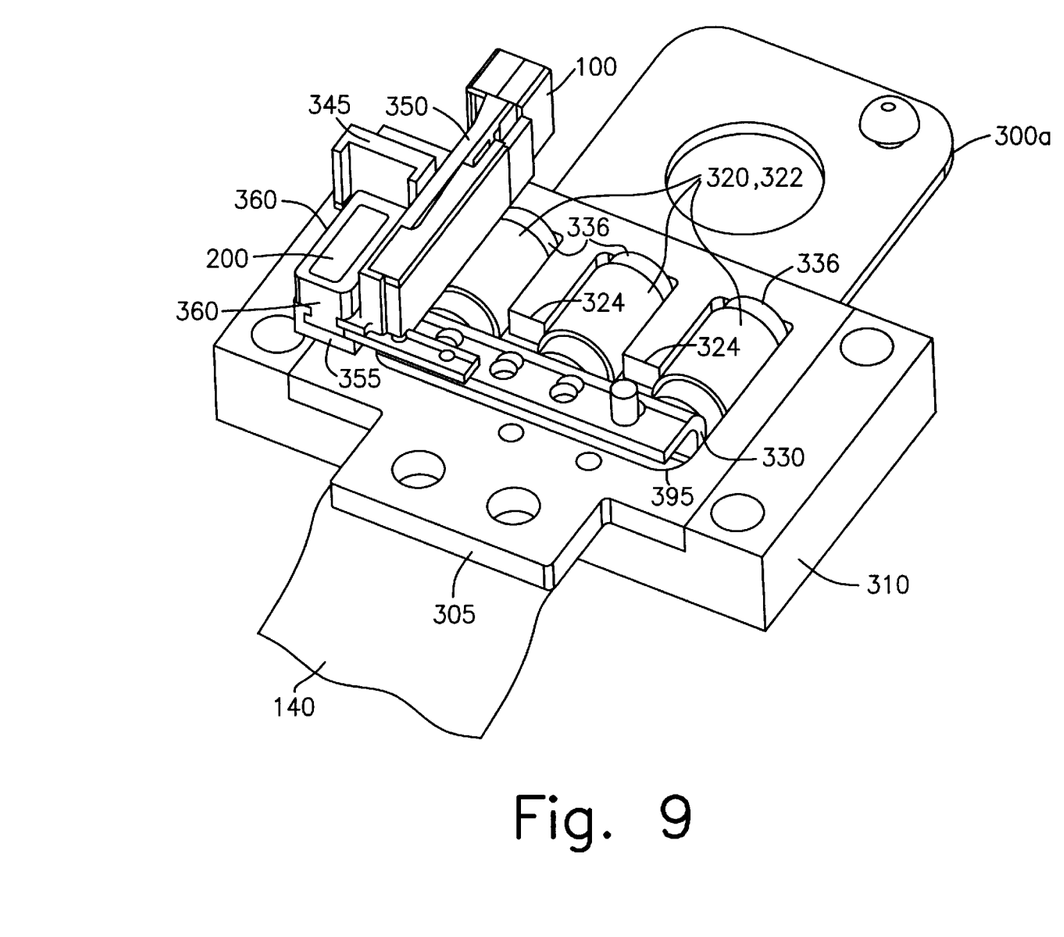
FIG. 9 is another perspective view with the cover removed and rotated 90°.

Referring now to FIGS. 9 and 11, a portion of moveable anchor member 305 fits within interior spring chamber 390. The left end of moveable anchor member 305 (as seen in FIG. 9) is connected to seat belt webbing 140. Bolts or other fastening methods are well known in the art to connect moveable anchor member 305 to webbing 140. The portion of moveable anchor member 305 that fits within interior spring chamber 390 is cut out to provide a cutout space 395 that accommodates at least one spring 320 and the interior vertical end portion of fixed anchor 300. As moveable anchor member 305 moves away from fixed anchor 300 due to tension in webbing 140, springs 320 are compressed as will be described in more detail below.

In the embodiment shown, three springs 320 are disposed within cutout space 395. Cutout space 395 is formed to produce a space to accommodate springs 320 and the vertical end of fixed anchor 300. Springs 320 fit between a moveable spring rest 336 formed by the trailing inner edge of cutout space 395 and a fixed spring rest 330 formed by the vertical portion of fixed anchor 300. A spring cover 322 may be used to keep spring 320 from rattling, quieting the operation of unit 20. Other methods of quieting springs are known such as coating springs 320 with a soft compound. Additionally, it may be desirable to pre-load springs 320 by slightly compressing them between moveable spring rest 336 and fixed spring rest 330 to eliminate rattling.

It is desirable to limit the movement of moveable anchor member 305 in order to prevent crushing or otherwise destroying the springs 320 disposed within cutout space 395. Motion stops 324 are used to limit the motion of moveable anchor member 305. As motion stops 324 make contact against fixed spring rest 330, further movement is prevented before damaging springs 320.

Figure 7:
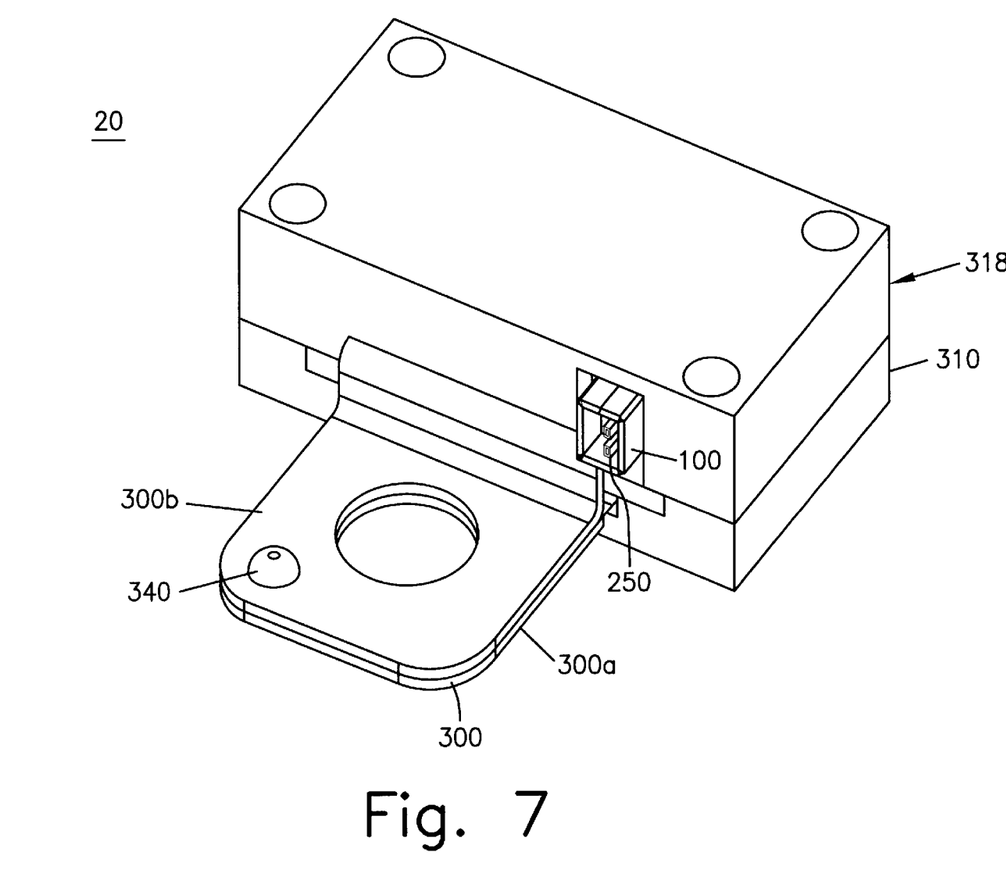
FIG. 7 is another external perspective view rotated 90° from FIG. 6.
Figure 8:
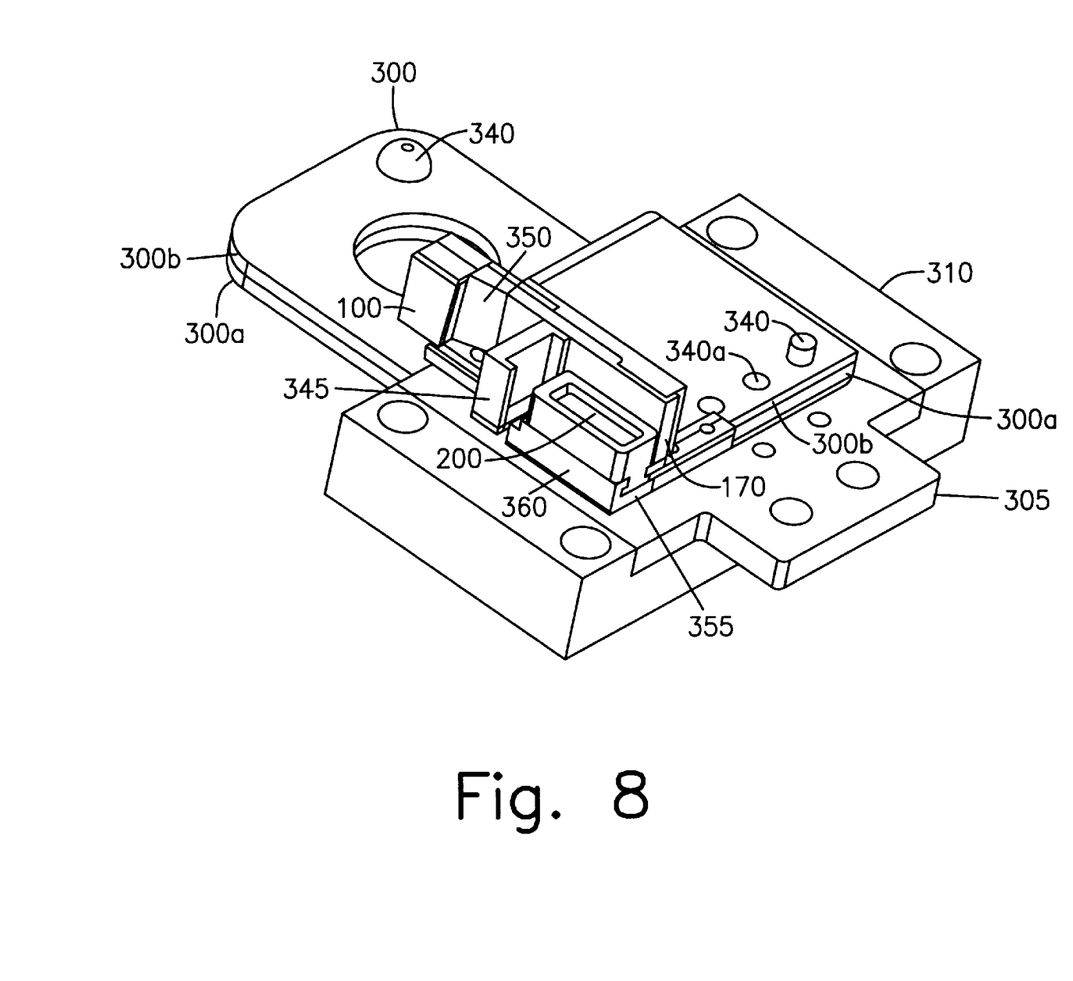
FIG. 8 is a perspective view with the cover removed to show the details of a second embodiment of the present invention.
Figure 10:
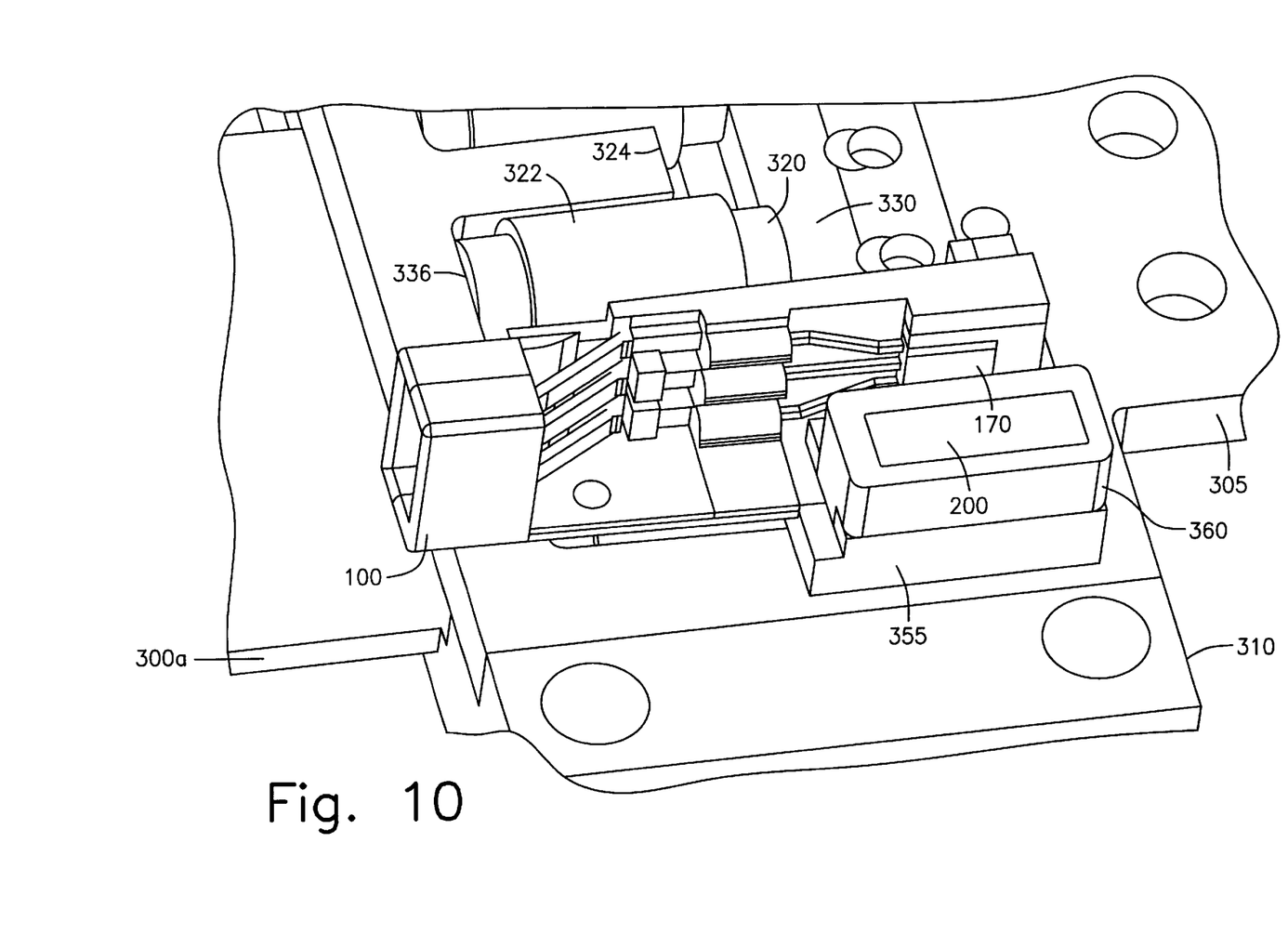
FIG. 10 is a close-up view of the Hall sensor and magnet.

Referring now to FIGS. 7, 8 and 10, in order to measure the change in tension of web 140, a Hall sensor 170 is mounted to portion of top anchor 300b which is covered by hall sensor cover 350. This provides a fixed position for Hall sensor 170 allowing accurate readings of the movement of moveable anchor member 305. In order for Hall sensor 170 to detect the tension in webbing 140, a magnet 200 is mounted inside top cover 318 in close proximity to Hall sensor 170. Top and bottom covers (318 and 310 respectively) are firmly attached to moveable anchor member 305 so that as moveable anchor member 305 moves due to changes in the tension of seat belt webbing 140, magnet 200 moves as well. In this way, Hall sensor 170 is able to convert the linear motion of moveable anchor member 305 into an electric signal that can be used for analysis as part of a system to determine if the air bag should be deployed in an emergency. A standard connector 100 as discussed in the previous embodiment is used to connect Hall sensor 170 to the electrical system of the vehicle (not shown).

Figure 12:
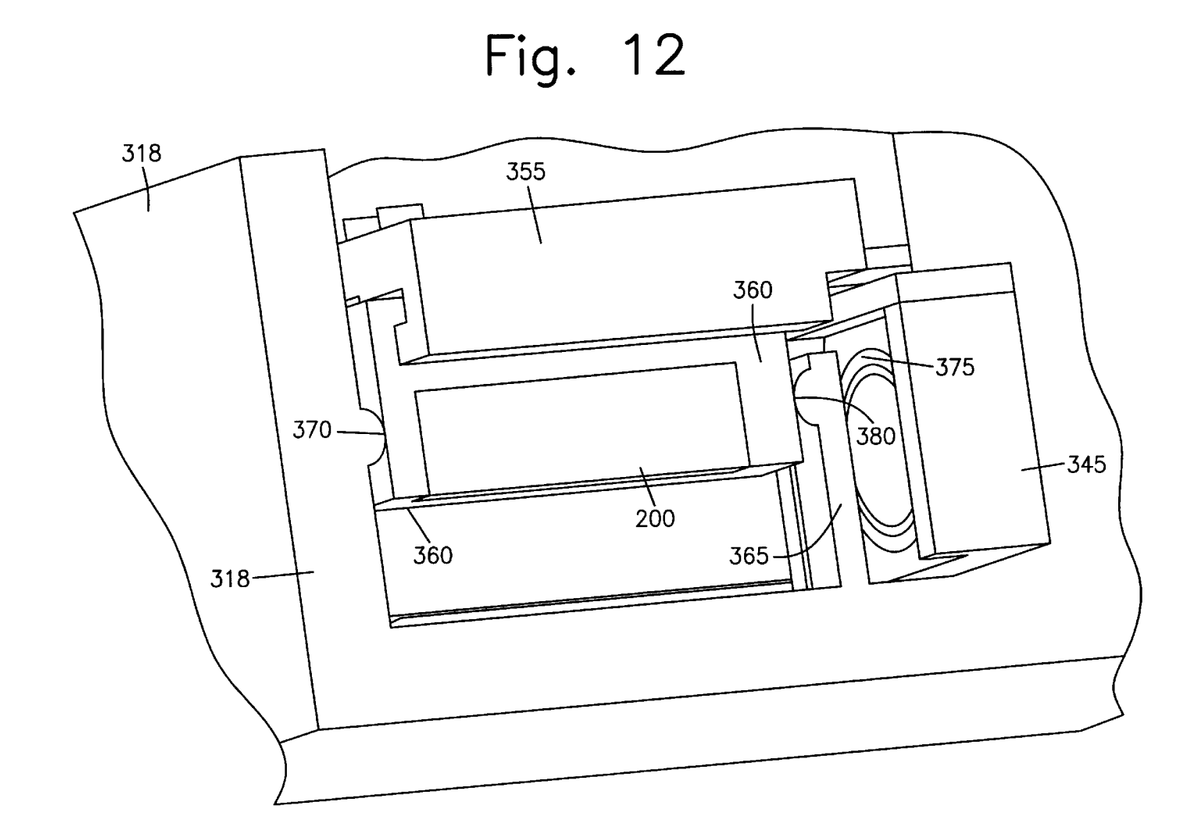
FIG. 12 is a close-up view of the floating magnet holder according to the embodiment of the present invention.

Referring now to FIGS. 8, 10 and 12, it is desirable to precisely align magnet 200 with Hall sensor 170. Any movement of magnet 200 not associated with changes in the tension of webbing 140 can be misinterpreted by Hall sensor 170. Changes in temperature, for example, may cause magnet 200 to move relative to Hall sensor 170 which can result in false readings. To minimize this kind of fluxation, magnet 200 is preferably mounted in a floating magnet holder 360. As shown specifically in FIG. 12, magnet 200 is mounted within floating magnet holder 360 and moveably rests within a Hall holder 355. Both floating magnet holder 360 and Hall holder sensor 355 are made from similar materials having similar thermal expansion properties. Floating magnet holder 360 rests against two contact points, a fixed contact point 370 and a moveable contact point 380. A wave spring 375 supplies the required biasing force urging a flexible contact point arm 365 against floating magnet holder 360. Floating magnet holder 360 moves as top cover 318 moves in response to changes in web tension.

In operation, seat belt tension unit 20 is connected using fixed anchor 300 to a seat belt mounting bolt in a vehicle. Moveable anchor member 305 fits within interior spring chamber 390 and is able to slide back and forth within chamber 390. As the tension in seat belt webbing 140 increases, moveable anchor member 305 moves away from anchor 300 and compresses springs 320 elastically retained between chamber 390 and cutout space 395. As the tension increases, springs 320 are further compressed until reaching a maximum point at which motion stops 324 make contact with fixed spring stop 330.

To detect the tension in webbing 140, Hall sensor 170 is mounted to anchor 300 and includes a connector 100 to allow Hall sensor 170 to communicate with the vehicle's electrical system. Floating magnet holder 360 and magnet 200 is mounted to top cover 318. Top cover 318 is connected to moveable anchor member 305 and joined to bottom cover 310 to protect and cover internal components of unit 20. Magnet 200 moves in response to the tension in webbing 140 and the linear movement of magnet 200 is interpreted by Hall sensor 170 as tension.

Because the alignment of magnet 200 with respect to Hall sensor 170 is critical, magnet 200 is fitted within a floating magnet holder 360 which is made of a material with similar properties as Hall sensor holder 355. In this way, any change due to thermal expansion is minimized. Additionally, since magnet 200 is constrained to move linearly by fitting between Hall sensor holder 355 and contact points 370 and 380, any torque applied will be prevented from causing false tension readings.

Of course other configurations are possible such as mounting hall sensor 170 to moveable anchor member 305 and mounting magnet to fixed anchor 300 to provide the necessary relative motion between hall sensor 170 and magnet 200 and are considered to be within the scope of the present invention. Utilizing a hall sensor to interpret tension as a function of linear motion is well known in the art and the above configuration is just one example of a possible arrangement of a hall effect sensing unit. Other configurations (i.e. an integrated circuit containing the sensor and all the associated electronics required) are possible and known in the art. The only requirement with respect to the sensor used is that it converts the linear motion of webbing 140 into an electric impulse which is proportional to the tension.

The normal operating range of seat belt tension unit 20 is between 1 to 30 pounds. It is preferred that motion stops 324 engage at around 40 pounds of pull.

It is important that seat belt sensor unit 20 be able to withstand at least 1000 pounds and still operate reliably over its normal operating range of 1 to 30 pounds. Also, to ensure safe operation of the seat belt restraint system (not shown), seat belt tension unit 20 must be able to withstand at least 3600 pounds of force without catastrophically failing. If a force of over 1000 pounds (but under 3600 pounds) is applied to seat belt tension unit 20, the tension sensing function ceases to operate. However, the user is still restrained. It is expected that a seat belt tension unit that is subjected to a force exceeding 1000 pounds will be replaced.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A webbing tension sensing unit for sensing tension in the webbing of a seat belt of an automobile, the webbing tension sensing unit comprising:
    a base;
    a rigid hinge arm pivotally connected to the base;
    a biasing element disposed between the base and the hinge arm wherein the hinge arm is elastically biased against a webbing passing over a free end of the hinge arm;
    a magnet; and
    a sensor for detecting motion of the hinge arm in response to a change in tension in the webbing, further wherein the sensor is a Hall effect sensor for detecting a change in a magnetic field at the sensor caused by relative motion of the sensor and magnet responsive to a change in tension in the webbing.

2. The webbing tension sensing unit of claim 1, wherein said biasing element is a spring.

3. The webbing tension sensing unit of claim 1, further comprising:
    a cover;
    said cover defining a gap between the base and the cover whereby the webbing passes therethrough.

4. The webbing tension sensing unit of claim 1, wherein the relative motion of the magnet and the Hall effect sensor describes an arcuate path, the magnet and the Hall effect sensor being disposed adjacent an edge of the webbing.

5. The webbing tension unit of claim 1, wherein
    the magnet is mounted on the hinge arm and is operatively coupled to the Hall effect sensor wherein the change in tension in the webbing results in a changing magnetic field that is detected by the Hall sensor.

6. The webbing tension sensing unit of claim 2 further comprising:
    a hinge arm spring pin;
    the hinge arm spring pin being generally centrally disposed on the free end of the hinge arm;
    a base spring pin;
    the base spring pin being generally centrally disposed on the base and substantially aligned with the hinge arm spring pin so that the spring is movably retained therein.

7. The webbing tension sensing unit of claim 1, wherein the sensor is mounted on the base.

8. The webbing tension sensing unit of claim 1, wherein the webbing is a seat belt.

9. A webbing tension sensing unit comprising:
    a fixed anchor;
    a moveable anchor member attachable to a webbing and slidably connected to the fixed anchor;

at least one biasing element elastically mounted between the fixed anchor and the moveable anchor member structured and arranged so that when the moveable anchor member slides with respect to the fixed anchor, the at least one biasing element is elastically deformed in relation to a tension force in the webbing; and a sensor for detecting a movement of the moveable anchor member with respect to the fixed anchor.

10. The webbing tension sensing unit of claim 9, further comprising:

a cover attached to the moveable anchor member wherein the at least one biasing element is enclosed by the cover.

11. The webbing tension sensing unit of claim 10, further comprising a magnet disposed on the cover; and the magnet being operably coupled to the sensor and wherein the sensor is a magnetic field sensor.

12. The webbing tension sensing unit of claim 11, wherein the sensor is a hall sensor.

13. The webbing tension sensing unit of claim 9, wherein the at least one biasing element is a spring.

14. The webbing tension sensing unit of claim 13, wherein the spring includes a spring cover structured and arranged to reduce noise produced by the spring.

15. A webbing tension sensing unit comprising:

an anchor;

a moveable anchor member attached to a webbing and slidably connected to the anchor;

at least one biasing element elastically mounted between the anchor and the moveable anchor member structured and arranged so that when the moveable anchor member slides with respect to the anchor, the at least one biasing element is elastically deformed in relation to a tension force in the webbing;

a magnetic field sensor for detecting a movement of the moveable anchor member with respect to the anchor;

a cover attached to the moveable anchor member wherein the at least one biasing element is enclosed by the cover; and further comprising:

a magnet holder disposed within the cover holding a magnet and structured and arranged to maintain a precise distance from the sensor.

16. The webbing tension sensing unit of claim 15, further comprising:

a sensor holder attached to the anchor structured and arranged to hold the sensor.

17. The webbing tension sensing unit of claim 16, wherein both the sensor holder and the magnet holder are made from materials having substantially similar coefficients of expansion.

18. The webbing tension sensing unit of claim 9 further comprising:

motion stops disposed between the fixed anchor and the moveable anchor member structured and arranged to prevent the at least one biasing element from moving past a specified point.

19. The webbing tension sensing unit of claim 9 wherein the webbing is a seat belt.

20. A webbing tension sensing unit comprising:

an anchor, a moveable anchor member attachable to a webbing and slidably connected to the anchor;

at least one biasing element elastically mounted between the anchor and the moveable anchor member structured and arranged so that when the moveable anchor member moves with respect to the anchor, the at least one biasing element is elastically deformed in relation to a tension force in the webbing; and a sensor for detecting movement of the moveable anchor member with respect to the anchor wherein the sensor comprises a sensor for detecting a magnetic field intensity and further comprising a magnet disposed in proximity to the sensor whereby when the moveable anchor moves in response to a tension force in the webbing, the sensor and the magnet relatively move with respect to each other, the magnet and sensor being disposed alongside each other with the distance between the magnet and the sensor being maintained substantially uniform during the relative movement.

21. The webbing tension sensing unit of claim 20 wherein one of the magnet and sensor are disposed so as to be moveable with the moveable anchor member and the other of the magnet and sensor are disposed fixed with respect to the anchor, the magnet and sensor being provided such that movement of the movable anchor member causes relative movement of the sensor and magnet.

22. The webbing tension sensing unit of claim 21, wherein the magnet and sensor are disposed on one side of the moveable anchor member.

23. The webbing tension sensing unit of claim 21, wherein the magnet is mounted for movement with the moveable anchor member and the sensor is fixed with respect to the anchor.

24. The webbing tension sensing unit member of claim 20, wherein the sensor comprises a Hall Effect sensor.

25. The webbing tension sensing unit member of claim 23, wherein the magnet is mounted in a floating magnet holder whereby movement of the magnet is minimized in response to a force not associated with change in webbing tension.

26. The webbing tension sensing unit member of claim 25, wherein the floating magnet holder comprises two members abutting against opposite portions of the magnet and holding the magnet in position, said two members not being fixedly attached to the magnet.

27. The webbing tension sensing unit member of claim 26, wherein each of the two members has a spherical contact point abutting against a respective portion of the magnet.

* * * * *